United States Patent
Kumagai et al.

(10) Patent No.: US 8,553,248 B2
(45) Date of Patent: Oct. 8, 2013

(54) IMAGE FORMING APPARATUS

(75) Inventors: Shigemi Kumagai, Kashiwa (JP); Yasuo Fukatsu, Abiko (JP); Ichiro Sasaki, Toride (JP); Hiroaki Tomiyasu, Toride (JP); Shunsuke Nishimura, Toride (JP); Yuzuru Yano, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 11/435,652

(22) Filed: May 17, 2006

(65) Prior Publication Data

US 2006/0262342 A1    Nov. 23, 2006

(30) Foreign Application Priority Data

May 20, 2005  (JP) ................................ 2005-147776

(51) Int. Cl.
    *G06F 3/12*   (2006.01)
(52) U.S. Cl.
    USPC ......... 358/1.15; 358/1.13; 358/1.14; 358/296
(58) Field of Classification Search
    USPC ............. 358/1.15, 1.14, 1.16, 1.13, 296, 304
    See application file for complete search history.

(56) References Cited

U.S. PATENT DOCUMENTS

| | | | | |
|---|---|---|---|---|
| 5,095,369 A * | 3/1992 | Ortiz et al. | ..................... | 358/296 |
| 5,450,571 A * | 9/1995 | Rosekrans et al. | ............... | 703/24 |
| 7,209,259 B2 * | 4/2007 | Tomita et al. | ................. | 358/1.18 |
| 2003/0030836 A1 * | 2/2003 | Maekawa | ..................... | 358/1.14 |
| 2003/0214684 A1 * | 11/2003 | Kuboki | ......................... | 358/474 |
| 2006/0001898 A1 * | 1/2006 | Maeshima et al. | ........... | 358/1.14 |

FOREIGN PATENT DOCUMENTS

| | | |
|---|---|---|
| JP | 08-044515 A | 2/1996 |
| JP | 11-191050 A | 7/1999 |
| JP | 11-334182 A | 12/1999 |
| JP | 2001-127928 A | 5/2001 |
| JP | 2004-325470 A | 11/2004 |

* cited by examiner

*Primary Examiner* — Vu B Hang
(74) *Attorney, Agent, or Firm* — Canon USA, Inc., IP Division (57) ABSTRACT

An image forming apparatus accumulates the number of input print jobs when a control circuit of the image forming apparatus recognizes that, during the execution of the first print job having a sheet post-processing setting, a subsequent new print job having no sheet post-processing settings is input. If the accumulated number of input print jobs is less than or equal to a predetermined value, the image forming apparatus allows the interruption of the first print job by the subsequent new job.

11 Claims, 7 Drawing Sheets

IMAGE FORMING APPARATUS

BACKGROUND OF THE INVENTION

1. Field of the Invention

The present invention relates to an image forming apparatus for forming images on sheets in response to a plurality of print jobs and performing post-processing of the sheets on which the images have been printed.

2. Description of the Related Art

Some known image forming apparatuses temporarily halt the processing of a job currently being processed to allow a subsequent job to interrupt the processing of the job currently being processed (refer to, for example, Japanese Patent Laid-Open No. 11-191050). Japanese Patent Laid-Open No. 11-191050 also describes that, when an interruption occurs, an image forming apparatus inquires to a submitter of the job currently being processed whether the submitter will allow the interruption from the subsequent job so as to handle the interruption in accordance with the answer from the submitter.

Additionally, some known image forming apparatuses identify the number of the unprocessed pages of the job currently being processed and the number of pages of an interrupting job so as to determine whether to allow the interruption on the basis of the identified numbers (refer to, for example, Japanese Patent Laid-Open No. 8-44515).

However, these known image forming apparatuses do not consider the output paper processing setting (post-processing of sheets), for example, stapling and punching of the sheets. Accordingly, if, for example, an interrupting job has an output paper processing setting, that job could require a longer processing time than an interrupted job. Therefore, a decision made to accept the interruption in this scenario makes no sense, which is a problem.

Furthermore, suppose that jobs which each have only a few pages and have no output paper processing setting are submitted in quick succession after a job having a post-processing setting is submitted. In this case, if these subsequent jobs which have no post-processing setting are processed first, the process of the interrupted job which has a post-processing setting is continuously postponed. Thus, the interrupted job is not completed.

SUMMARY OF THE INVENTION

The present invention provides an image forming apparatus and a method for controlling the image forming apparatus that can solve the above-described problems. The present invention also provides an image forming apparatus and a method for controlling the image forming apparatus that allows an appropriate interrupt process when a job that has no post-processing settings of a sheet and requires a small amount of processing time is submitted.

According to one exemplary embodiment of the present invention, an image forming apparatus is provided which includes a print job input unit configured to receive a print job, where the print job input unit is capable of receiving a print job during execution of the input print job; a job storing unit configured to store the input print job, where the job storing unit is capable of storing a plurality of print jobs; a job determination unit configured to determine a setting condition corresponding to at least one of the stored plurality of print jobs; an image forming unit configured to form an image on a sheet based on at least one print job read out from the job storing unit; a sheet post-processing unit configured to perform post-processing on sheets on which images have been formed; and a control unit configured to determine, during execution of a first print job, whether an interruption from a subsequent print job is allowed or not based on a determination result from the job determination unit; wherein when a print job having no post-processing settings is input during the execution of the first print job, the control unit accumulates the number of input print jobs, wherein the control unit allows an interruption of the first print job by the input job if the accumulated number of input print jobs is less than or equal to a predetermined value, wherein the control unit inhibits the interruption of the first print job by the input job if the accumulated number of input print jobs is greater than the predetermined value.

According to an aspect of the present embodiment, the control unit determines whether the interruption of the first print job by the subsequent print job is allowed or not when the first print job has a post-processing setting. According to another aspect of the present embodiment, the sheet post-processing unit carries out at least one of a stapling process, a punching process, a folding process, a binding process, and a cutting process for the sheet.

According to one exemplary embodiment of the present invention, an image forming apparatus is provided which includes a print job input unit configured to receive a print job, where the print job input unit is capable of receiving a print job during execution of the input print job; a job storing unit configured to store the input print job, where the job storing unit is capable of storing a plurality of print jobs; a job determination unit configured to determine a setting condition corresponding to at least one of the stored plurality of print jobs; an image forming unit configured to form an image on a sheet based on at least one print job read out of the job storing unit; a sheet post-processing unit configured to perform post-processing on sheets on which images have been formed; and a control unit configured to determine, during execution of a first print job, whether an interruption from a subsequent print job is allowed or not based on a determination result from the job determination unit; wherein, when a print job having no post-processing settings is input during the execution of the first print job, the control unit accumulates the number of prints of the input jobs, wherein the control unit allows the interruption of the first print job by the input job if the accumulated number of prints is less than or equal to a predetermined value, wherein the control unit inhibits the interruption of the first print job by the input job if the accumulated number of prints is greater than the predetermined value.

According to an aspect of the present invention, the control unit determines whether the interruption of the first job by the subsequent print job is allowed or not when the first print job has a post-processing setting.

According to one exemplary embodiment of the present invention, an image forming apparatus is provided which includes a print job input unit configured to receive a print job, where the print job input unit is capable of receiving a print job during execution of the input print job; a job storing unit configured to store the input print job, where the job storing unit is capable of storing a plurality of print jobs; a job determination unit configured to determine a setting condition corresponding to at least one of the stored plurality of print jobs; an image forming unit configured to form an image on a sheet based on at least one print job read out of the job storing unit; a sheet post-processing unit configured to perform post-processing on sheets on which images have been formed; and a control unit for determining, during execution of a first print job, whether an interruption from a subsequent print job is allowed or not based on a determination result from the job determination unit; wherein, when a print job having no post-processing settings is input during the execution of the first print job, the control unit accumulates the print processing times of the input jobs, wherein the control unit allows an interruption of the first print job by the input job if the total accumulated print processing time is less than or equal to a predetermined value, wherein the control unit inhibits the interruption of the first print job by the input job if the total accumulated print processing time is greater than the predetermined value.

According to an aspect of the present embodiment, the control unit determines whether the interruption of the first print job by the subsequent print job is allowed or not when the first print job has a post-processing setting. According to another aspect of the present invention, the control unit estimates the processing time of the input print job based on the setting condition.

According to one exemplary embodiment of the present invention, an image forming method for use in an image forming apparatus is provided which includes determining whether a print job having no post-processing settings is input during the execution of a first print job; accumulating the number of input print jobs when it is determined that the print job having no post-processing settings is input; and allowing an interruption of the first print job by the input job if the accumulated number of input print jobs is less than or equal to a predetermined value and inhibiting interruption of the first print job by the input job if the accumulated number of input print jobs is greater than the predetermined value.

According to another aspect of the present invention, an image forming method for use in an image forming apparatus is provided which includes determining whether a print job having no post-processing settings is input during the execution of the first print job; accumulating the number of prints of the input jobs when it is determined that the print job having no post-processing settings is input; and allowing the interruption of the first print job by the input job if the accumulated number of prints is less than or equal to a predetermined value and inhibiting interruption of the first print job by the input job if the accumulated number of prints is greater than the predetermined value.

According to one exemplary embodiment of the present invention, an image forming method for use in an image forming apparatus is provided which includes determining whether a print job having no post-processing settings is input during the execution of the first print job; accumulating print processing times of the input jobs when it is determined that the print job having no post-processing settings is input; and allowing the interruption of the first print job by the input job if the total accumulated print processing time is less than or equal to a predetermined value and inhibiting interruption of the first print job by the input job if the total accumulated print processing time is greater than the predetermined value.

According to one exemplary embodiment of the present invention, an image forming apparatus adapted to perform post-processing on sheets on which images have been formed is provided which includes a job determination unit configured to determine a setting condition of at least one of stored print jobs; and a control unit configured to determine, during execution of a first print job, whether an interruption from a subsequent print job is allowed or not based on a determination result from the job determination unit; wherein when a print job having no post-processing settings is input during the execution of the first print job, the control unit accumulates the number of input print jobs, wherein the control unit allows an interruption of the first print job by the input job if the accumulated number of input print jobs is less than or equal to a predetermined value, wherein the control unit inhibits the interruption of the first print job by the input job if the accumulated number of input print jobs is greater than the predetermined value.

According to an aspect of the present invention, the control unit determines whether the interruption of the first print job by the subsequent print job is allowed or not when the first print job has a post-processing setting.

According to one exemplary embodiment of the present invention, an image forming apparatus adapted to perform post-processing on sheets on which images have been formed is provided which includes a job determination unit configured to determine a setting condition of at least one of stored print jobs; a control unit configured to determine, during execution of a first print job, whether an interrupt from a subsequent print job is allowed or not based on a determination result from the job determination unit; wherein, when a print job having no post-processing settings is input during the execution of the first print job, the control unit accumulates the number of prints of the input jobs, wherein the control unit allows the interruption of the first print job by the input job if the accumulated number of prints is less than or equal to a predetermined value, wherein the control unit inhibits the interruption of the first print job by the input job if the accumulated number of prints is greater than the predetermined value.

According to an aspect of the present embodiment, the control unit determines whether the interruption of the first job by the subsequent print job is allowed or not when the first print job has a post-processing setting.

According to one exemplary embodiment of the present invention, an image forming apparatus adapted to perform post-processing on sheets on which images have been formed comprising is provided which includes a job determination unit configured to determine a setting condition of at least one of print jobs; and a control unit for determining, during execution of a first print job, whether an interrupt from a subsequent print job is allowed or not based on a determination result from the job determination unit; wherein, when a print job having no post-processing settings is input during the execution of the first print job, the control unit accumulates the print processing times of the input jobs, wherein the control unit allows an interruption of the first print job by the input job if the total accumulated print processing time is less than or equal to a predetermined value, wherein the control unit inhibits the interruption of the first print job by the input job if the total accumulated print processing time is greater than the predetermined value.

According to an aspect of the present embodiment, wherein the control unit determines whether the interruption of the first print job by the subsequent print job is allowed or not when the first print job has a post-processing setting. And finally, according to another aspect of the present embodiment, the control unit estimates a processing time of the input print job on the basis of the setting condition.

According to the aforementioned embodiments, even when a large number of new jobs that require less processing time are submitted after a job that has a sheet post-processing setting is submitted, the interrupted job can be output at an appropriate timing by limiting the number of jobs that are allowed to interrupt, by limiting the number of pages of a job that is allowed to interrupt, or by limiting the processing time of a job that is allowed to interrupt.

Further features and aspects of the present invention will become apparent from the following description of the numerous exemplary embodiments with reference to the attached drawings.

DESCRIPTION OF THE EMBODIMENTS

Numerous exemplary embodiments, features and aspects of an image forming apparatus according to the present invention are now herein described with reference to the accompanying drawings.

First Exemplary Embodiment

Figure 1:
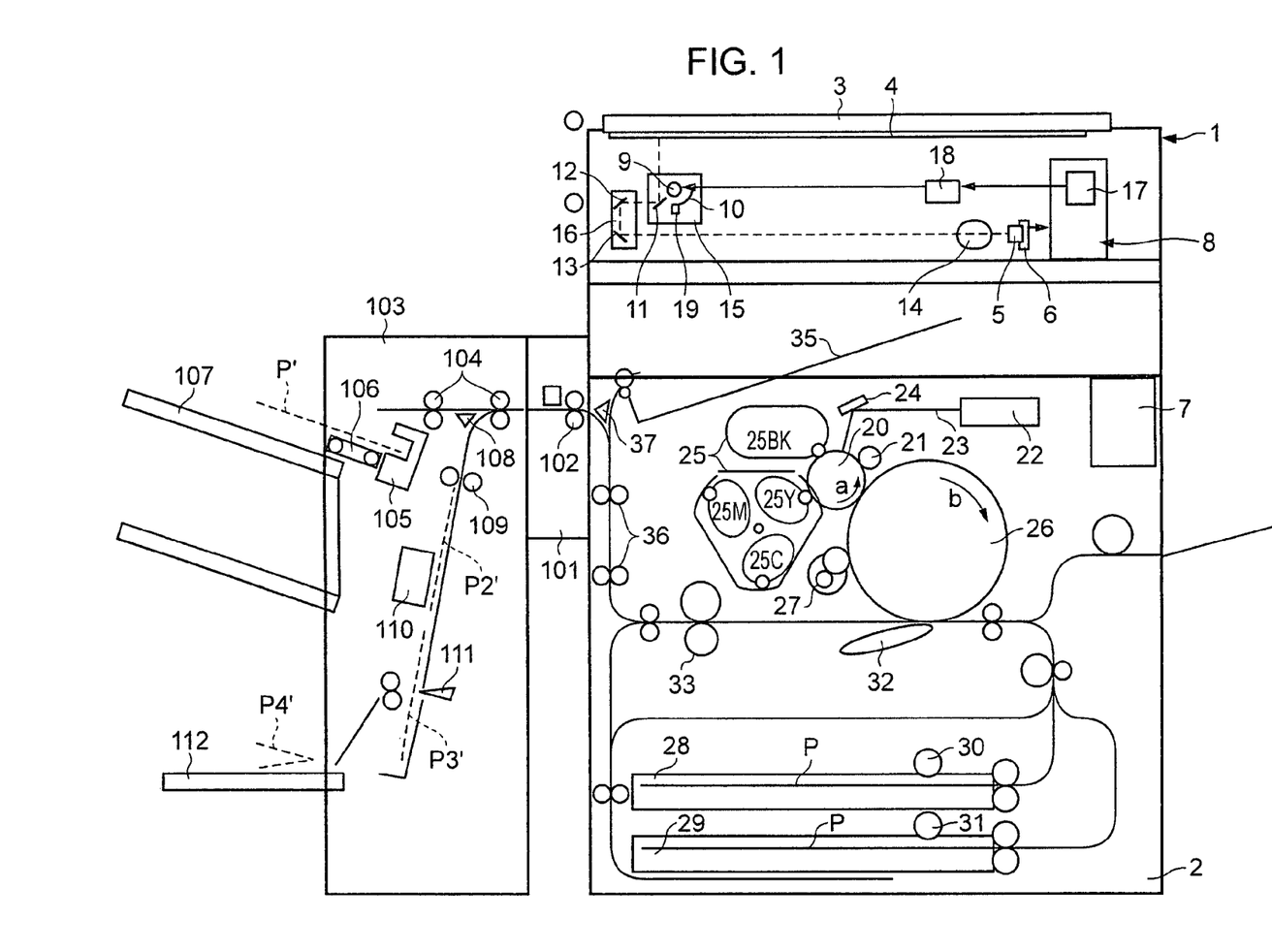
FIG. 1 is a sectional view of an exemplary structure of an image forming apparatus according to an embodiment of the present invention.

FIG. 1 illustrates a sectional view of an exemplary structure of an image forming apparatus according to a first embodiment of the present invention. The image forming apparatus includes an image scanner unit 1 for scanning a document and outputting a digital color image signal, a printer unit 2 for forming an image on a recording paper sheet serving as a recording medium on the basis of the digital color image signal output from the image scanner unit 1, and a document pressing plate 3 for bringing the document in tight contact with a document glass 4.

The image forming apparatus further includes a charge-coupled device (CCD) 5, a board 6 on which the CCD 5 is mounted, a printer control unit 7 including a circuit for driving various motors of the printer unit 2, and an image processing unit 8. The image processing unit 8 sample-holds an analog image signal output from the CCD 5, amplifies the analog image signal, and converts the analog image signal to a digital signal. The image processing unit 8 converts the analog image signal to, for example, an 8-bit digital signal for each of R, G, and B colors, performs various processing (e.g., masking and gamma correction) on that signal, and delivers the image signal to a laser scanning unit 22, which is described below. The image forming apparatus further includes a fluorescent lamp 9 for emitting light to the document, a reflector 10 for collecting the light from the fluorescent lamp 9 onto the document, mirrors 11 to 13, a lens 14 for collecting light reflected off the document onto the CCD 5, a carriage 15 (hereinafter referred to as a "first mirror stage") for containing the fluorescent lamp 9, the reflector 10, and the mirror 11, and a carriage 16 (hereinafter referred to as a "second mirror stage") for containing the mirrors 12 and 13.

The image forming apparatus further includes a fluorescent lamp control circuit 17. The fluorescent lamp control circuit 17 generates a PWM pulse signal having a constant cycle and a variable duty on the basis of an illumination control signal output from the image processing unit 8 and delivers the PWM pulse signal to a fluorescent lamp driving circuit 18.

The fluorescent lamp driving circuit 18 makes the fluorescent lamp 9 illuminate on the basis of the PWM pulse signal. The fluorescent lamp control circuit 17 checks the output value of a light intensity sensor 19 and controls the light intensity by changing the duty of the PWM pulse signal such that the output value is set equal to a predetermined constant value. The first mirror stage 15 and the second mirror stage 16 physically move at a speed of V and a speed of V/2, respectively, in a direction perpendicular to the electrical scanning direction (main scanning direction) of the CCD 5 (i.e., in a sub scanning direction). Thus, the entire surface of the document is scanned.

A photoconductive drum 20 is driven in a counterclockwise direction (direction shown by arrow a) at a predetermined circumferential speed (i.e., process speed). The surface of the photoconductive drum 20 is charged to a predetermined potential level by a charger roller 21. Scanning exposure is then performed by a laser beam 23 output from a laser scanning unit 22. The laser beam 23 is pulse-width modulated in accordance with a digital image signal input from the image processing unit 8. Thus, an electrostatic latent image corresponding to image information is formed on the surface of the photoconductive drum 20.

A reflecting mirror 24 deflects the laser beam 23 emitted from the laser scanning unit 22 onto the photoconductive drum 20. A developer unit 25 includes a rotary switching color developer having a yellow toner developer 25Y, a magenta toner developer 25M, and a cyan toner developer 25C, and a black developer having a black toner developer 25BK.

An intermediate transfer drum 26 is disposed so as to be in contact with the photoconductive drum 20 or close to the photoconductive drum 20 and is driven in a direction opposite to the direction in which the photoconductive drum 20 (direction shown by arrow b) is driven at about the same circumferential speed as the photoconductive drum 20.

The electrostatic latent image formed on the photoconductive drum 20 is developed with toner. This process is repeated for all the color components. Subsequently, the toner images of all the color components are transferred onto the intermediate transfer drum 26 one on top of the other. Thus, a full-color toner image is formed on the surface of the intermediate transfer drum 26.

Thereafter, a recording paper sheet P is fed from a feeder cassette 28 or a feeder cassette 29 to the intermediate transfer drum 26 by a feeder roller 30 or a feeder roller 31. The full-color toner image formed on the intermediate transfer drum 26 is transferred onto the recording paper sheet P. Thus, a full-color image is formed on a surface of the recording paper sheet P.

By applying charge having a polarity opposite to that of the toner image to the back surface of the recording paper sheet P by a transfer charging unit 32, the full-color toner image is transferred from the intermediate transfer drum 26 onto the recording paper sheet P. After the full-color toner image is transferred onto the recording paper sheet P, the recording paper sheet P is separated from the intermediate transfer drum 26 and is delivered into a fixing unit 33, in which the full-color toner image is fused onto the recording paper sheet P by heat.

The recording paper sheet P on which the full-color toner image has been fused is output to a punch unit 101, which is one of sheet post-processing units, by a discharge conveying roller 36 and a switching flapper 37, or the recording paper sheet P can be discharged to a discharging tray 35. If a punch-hole setting is specified as sheet post-processing, two to four punch holes are created in the recording paper sheet P. Thereafter, the recording paper sheet P is delivered to a finisher 103 by a transport roller 102. If a punch-hole setting is not specified, the recording paper sheet P passes straight through the punch unit 101.

A cleaner 27 cleans the circumference of the intermediate transfer drum 26. The cleaner 27 removes toner remaining on the intermediate transfer drum 26 after the toner image is transferred to the recording paper sheet P.

In the finisher 103, a transport roller 104 transports the recording paper sheet P. If a stapling setting is specified as sheet post-processing, the finisher 103 stacks a plurality of the recording paper sheets P at a position P' and a stapler unit 105 staples the edges of the recording paper sheets P. Thereafter, the finisher 103 outputs the recording paper sheets P onto a stack tray 107. If a binding setting is specified as sheet post-processing, the finisher 103 causes a flapper 108 to switch so as to transport the recording paper sheets P to a position P2' by using a transport roller 109. At the position P2', a stapler unit 110 staples the recording paper sheets P in the middle. The finisher 103 further transports the recording paper sheets P to a position P3', where a saddle stitching unit 111 folds the recording paper sheets P in the middle and outputs the bound sheets onto a stack tray 112 (a position P4').

Figure 2:
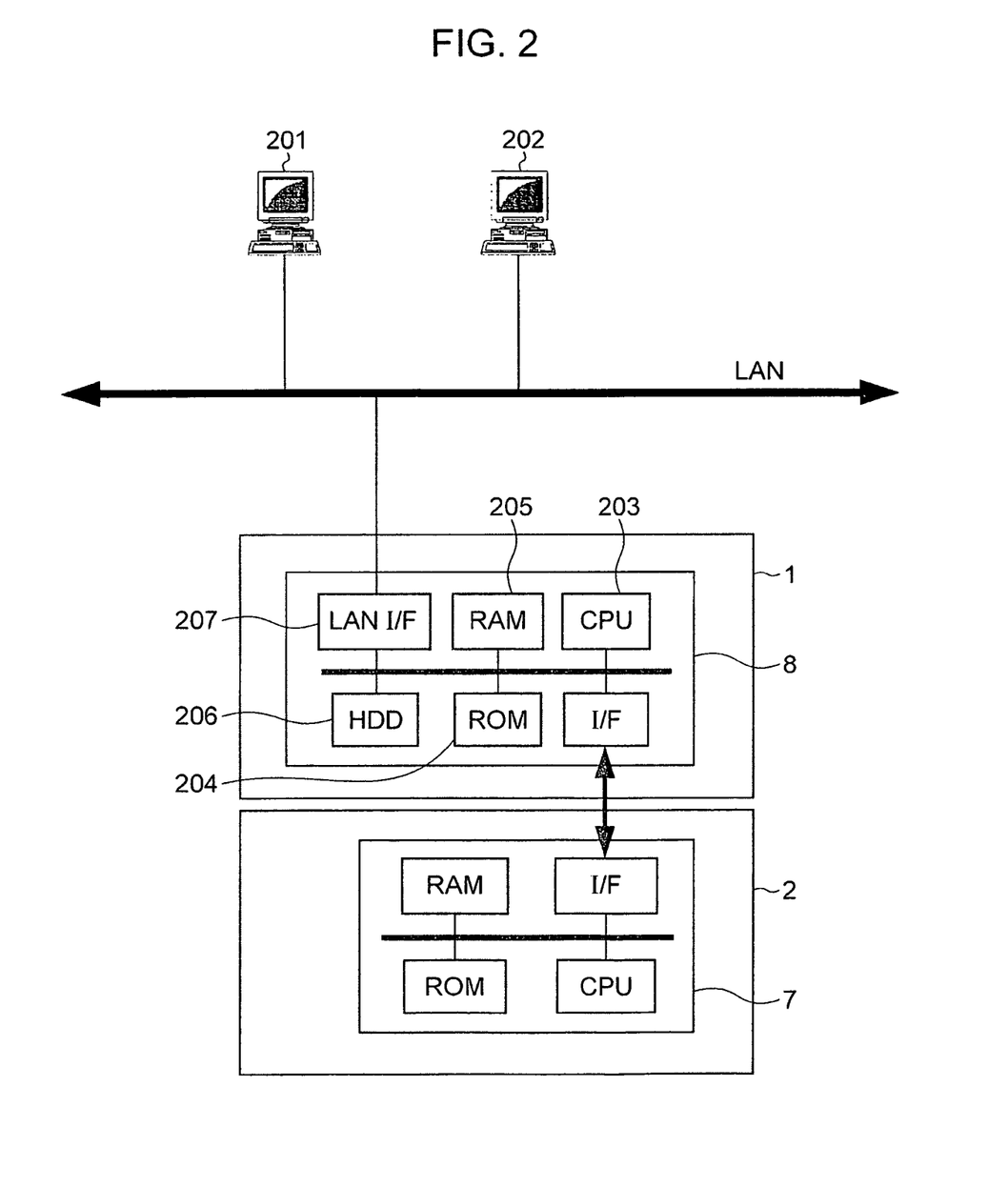
FIG. 2 is a block diagram of an exemplary system configuration of the image forming apparatus.

FIG. 2 is a block diagram of an exemplary digital color copier system according to this embodiment of the present invention. Host computers 201 and 202 that submit print jobs are connected to a network, such as a local area network (LAN). The image processing unit 8 includes a central processing unit (CPU) 203, a read only memory (ROM) 204, a random access memory (RAM) 205, a hard disk drive (HDD) 206, and a LAN interface (I/F) 207. The RAM 205 serving as a job storing unit is also used as a working area of the computing process of control. The RAM 205 also provides a storage area for storing the number of jobs. Additionally, the HDD 206 can store the jobs.

Figure 3:
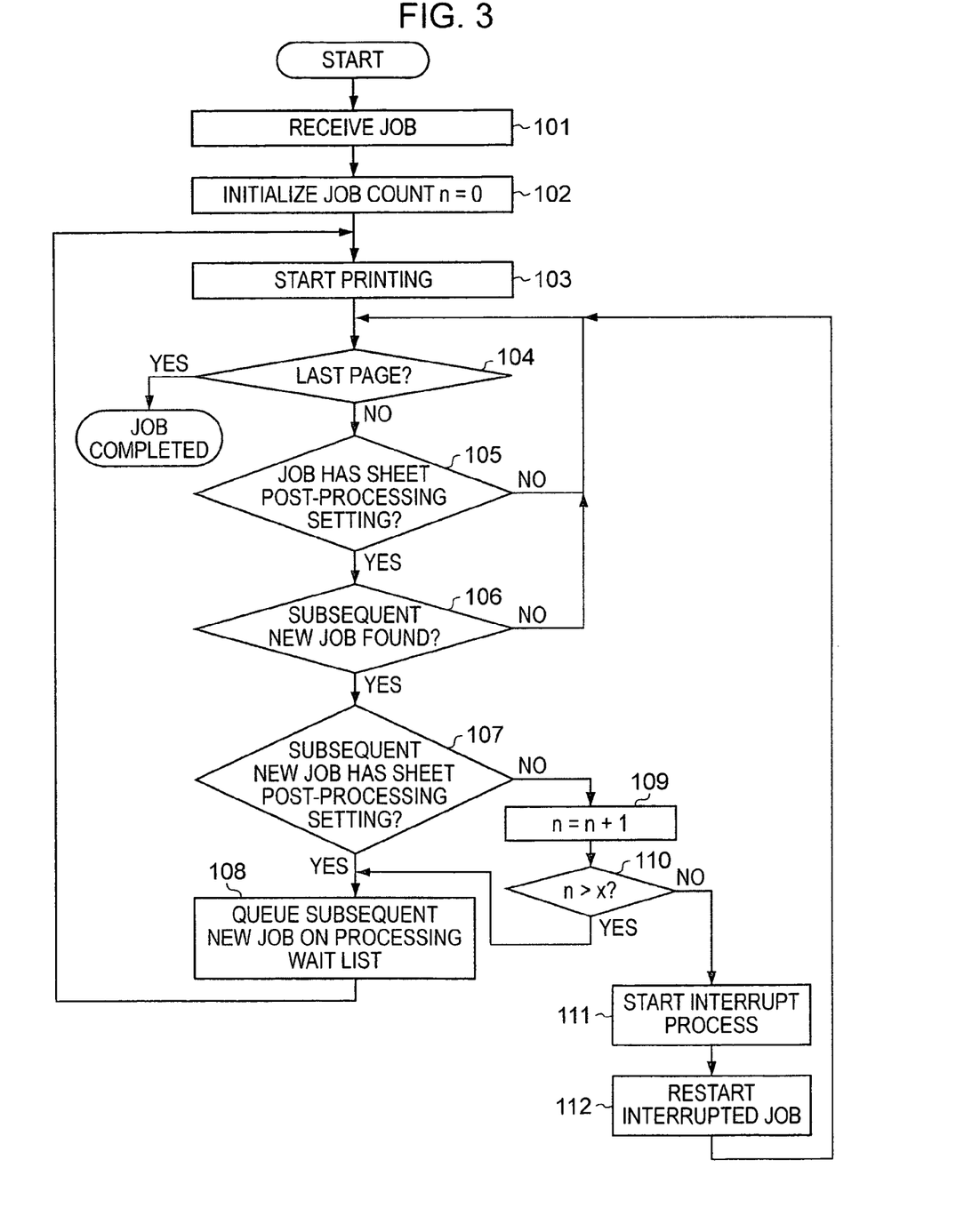
FIG. 3 is a flow chart of an exemplary data processing procedure of an image forming apparatus according to a first embodiment of the present invention.

FIG. 3 is a flow chart of an exemplary data processing procedure of the image forming apparatus according to this embodiment of the present invention. When a print job is submitted from the host computer 201 or 202, the image forming apparatus accepts the print job (hereinafter simply referred to as a "job") at step 101 and stores data about the job in the HDD 206. At step 102, a job counter that stores the number of interrupted jobs in one job is initialized. Thereafter, at step 103, a print process of the accepted job is started. At step 104, it is determined whether the print data of the job currently being processed is data of the last page. If the data is data of the last page, the process of the job is completed immediately after the printing is completed.

However, if it is determined at step 104 that the data is not data of the last page, the processing proceeds to step 105, where it is determined whether the current job has a sheet post-processing setting, such as a sort setting, a staple setting, a saddle stitch setting, or a punch setting. If the current job has no sheet post-processing setting, the processing proceeds to step 104, where the current print job continues to be processed. If the current job has a sheet post-processing setting, it is determined at step 106 whether a subsequent new job is submitted. If no subsequent new job is submitted, the processing proceeds to step 104, where the current print job continues to be processed.

If a subsequent new job is submitted, it is determined at step 107 whether the subsequent new job has a sheet post-processing setting (e.g., a sort setting, a staple setting, a saddle stitch setting, or a punch setting). If the subsequent new job has a sheet post-processing setting, the job currently being processed is not interrupted and the processing proceeds to step 108. At step 108, the subsequent new job is queued in a processing wait list. If, at step 107, it is determined that the subsequent new job has no sheet post-processing setting, the processing proceeds to step 109. At step 109, a counter value n in the job counter is incremented by one.

Subsequently, the processing proceeds to step 110, where the counter value n is compared with a predetermined limit value x (for example, 5). If $n \leq x$, the processing proceeds to step 111, where the job currently being processed is interrupted and the print process of the subsequent new job is started (an interrupt process).

After the print process of the subsequent new job is completed, the processing proceeds to step 112. At step 112, the print process of the job that has been interrupted is restarted so that the processing returns to step 104. In contrast, if, at step 110, $n > x$, it is determined that the number of jobs that are allowed to interrupt exceeds the upper limit, and therefore, the processing returns to step 108 without processing the interruption.

Figure 6:
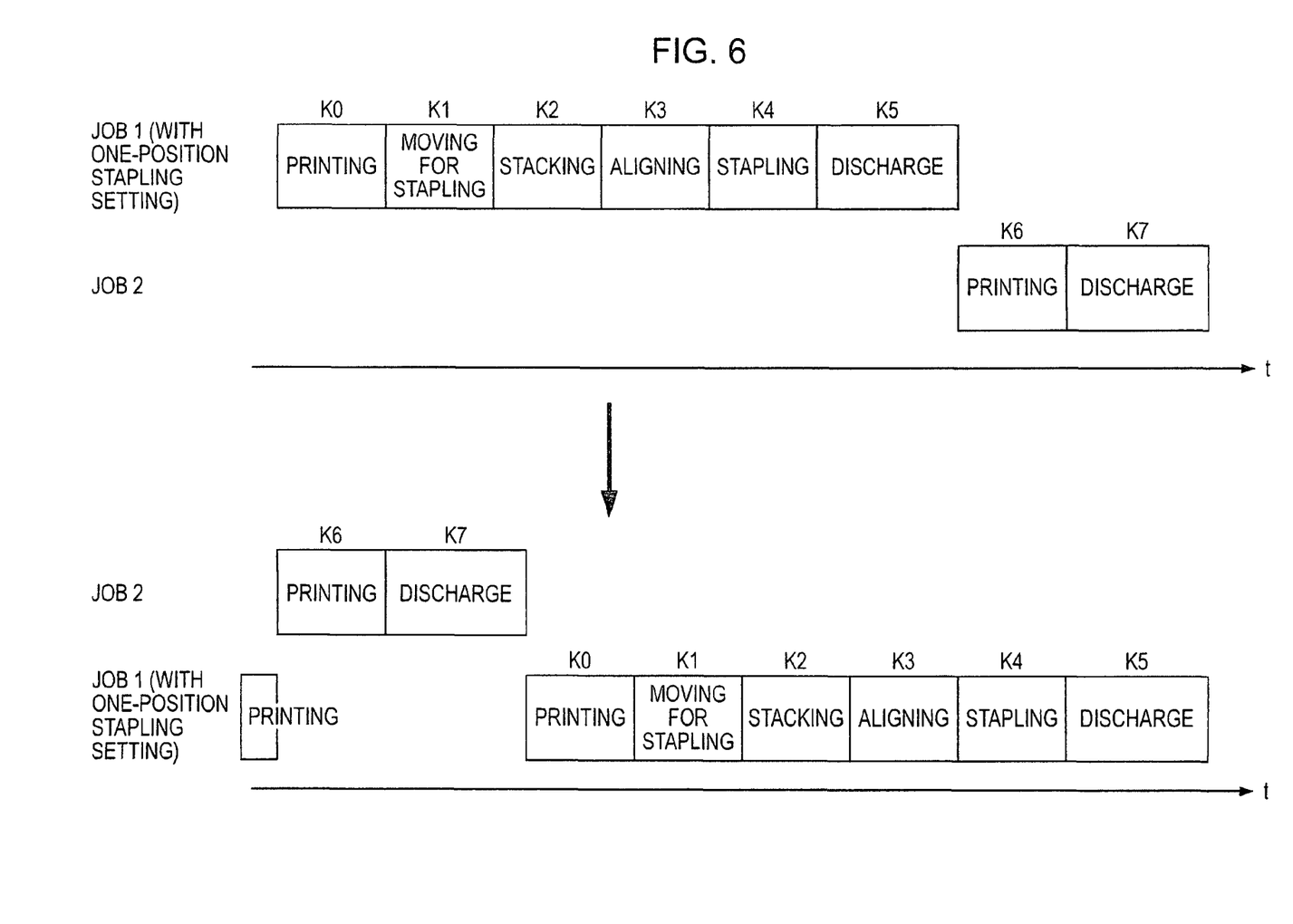
FIG. 6 is a time-sequence diagram of an exemplary print process, a sheet post-process, and an interrupt process of the image forming apparatus according to the first embodiment of the present invention.

FIG. 6 is a time-sequence diagram of an exemplary print process, a sheet post-process, and an interrupt process. For example, the host computer 201 submits a job (job 1) via a LAN. The job 1 has settings "sheet count=3, stapling one position, and copy count=1." While the print operation of the job 1 is being executed, the host computer 202 (a different user) submits a job (job 2). The job 2 has settings "sheet count=1, no sheet post-process, and copy count=1." A time-series relationship between the two input jobs is shown in the upper section of FIG. 6.

The two jobs input from the host computers 201 and 202 are temporarily stored in the HDD 206. Subsequently, the CPU 203 serving as job monitoring means checks which sheet post-processing setting the job 1 stored in the HDD 206 has, and subsequently, checks which sheet post-processing setting the job 2 has. If the job 2 has no sheet post-processing setting, the CPU 203 serving as job controlling means compares the number of jobs with the limit number. If the number of jobs is less than or equal to the limit number, the CPU 203 changes the processing orders of the job 1 and job 2 (see the lower section of FIG. 6).

After the execution of the job 2 (see K6 and K7 in the lower section of FIG. 6) is completed, the remaining printing process of the job 1 is started (see K0 in the lower section of FIG. 6). Subsequently, a sheet post-processing is started. The stapler unit 105 moves from the initial standby position to a stitching position at which the stack of the recording paper sheets P is stitched (see K1 in the lower section of FIG. 6). The stapler unit 105 sequentially receives three of the recording paper sheets P conveyed from the transport roller 104 and stacks the sheets on a processing tray 106 (FIG. 1) (see K2 in the lower section of FIG. 6). An alignment plate (not shown) aligns the sheets in the widthwise direction (see K3 in the lower section of FIG. 6). Thereafter, the stapler unit 105 staples the sheets (see K4 in the lower section of FIG. 6). Finally, a discharge roller of the processing tray 106 discharges the sheets onto the stack tray 107 (see K5 in the lower section of FIG. 6).

It is noted that if, at step 106 (from FIG. 3), the subsequent new job requests an interrupt process, the processing may proceed to step 107. Similarly, if, at step 106, the subsequent new job has a higher priority than that of the job currently being processed, the processing may proceed to step 107. Furthermore, step 106 may be executed first before step 105 is executed so that the processing may proceed to step 107 when the job currently being processed has no sheet post-processing settings.

Such a control allows a new job requiring less processing time to be completed first by using an interruption if the new job that has a few sheets and no sheet post-processing settings is input while a job that has a sheet post-processing setting (e.g., stapling) is currently being processed.

In addition, the number of interrupting jobs can be limited. Accordingly, even when a large number of new jobs that require less processing time are input, too late completion of the job currently being processed can be prevented.

Second Exemplary Embodiment

In the first embodiment, the permission of interruption of a job currently being processed by a new job is determined on the basis of the number of jobs that are allowed to interrupt the job currently being processed. On the other hand, in a second exemplary embodiment, the permission of interruption of a job currently being processed by a new job is determined on the basis of the total print count of new jobs that are allowed to interrupt the job currently being processed. For the second embodiment, only differences between the present embodiment and the first embodiment will be discussed, and therefore, other descriptions are not repeated.

Figure 4:
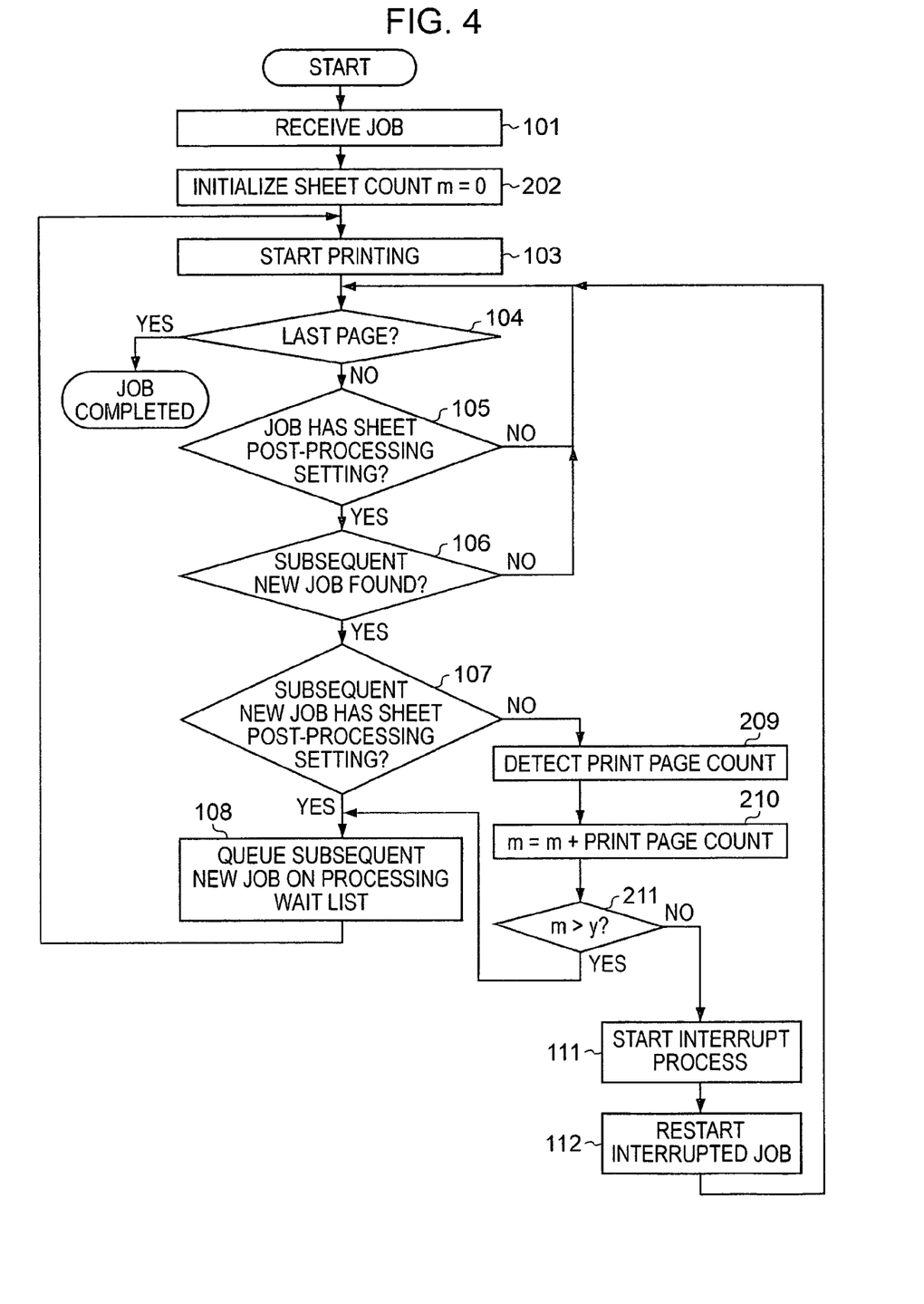
FIG. 4 is a flow chart of an exemplary data processing procedure of an image forming apparatus according to a second embodiment of the present invention.

FIG. 4 is a flow chart of an exemplary data processing procedure of an image forming apparatus according to the second embodiment of the present invention. The difference between the present embodiment and the first embodiment is described next. At step 202, a sheet counter that holds a total print count of jobs that interrupt one job is initialized. At step 209, the number of prints about a new job submitted from the host computer 201 or 202 is detected. At step 210, this number of prints is added to the sheet count m in the sheet counter. At step 211, the sheet count m is compared with a predetermined limit value y. If m≤y, the processing proceeds to step 111, where the job currently being processed is interrupted and the print process of the subsequent new job is started (an interrupt process). It is noted that in the second embodiment, the print count information about the subsequent job may be stored in the RAM 205.

After the print process of the subsequent new job is completed, the processing proceeds to step 112. At step 112, the print process of the job that has been interrupted is restarted so that the processing returns to step 104. If, at step 211, m>y, it is determined that the number of jobs that are allowed to interrupt exceeds the upper limit, and the process returns to step 108 without processing the interrupt.

Alternatively, the first embodiment may be combined with the second embodiment. In this case, even when the counter value n in the first embodiment is less than or equal to x, the interrupt is inhibited if the total print count m exceeds y.

Third Exemplary Embodiment

In a third embodiment, the permission of interruption of the job currently being processed by a new job is determined on the basis of the estimated total processing time of a job that is allowed to interrupt the job currently being processed. For the third embodiment, only differences between the present embodiment and the first embodiment (or the second embodiment) will be discussed, and therefore, other descriptions are not repeated.

Figures 5, 5A:
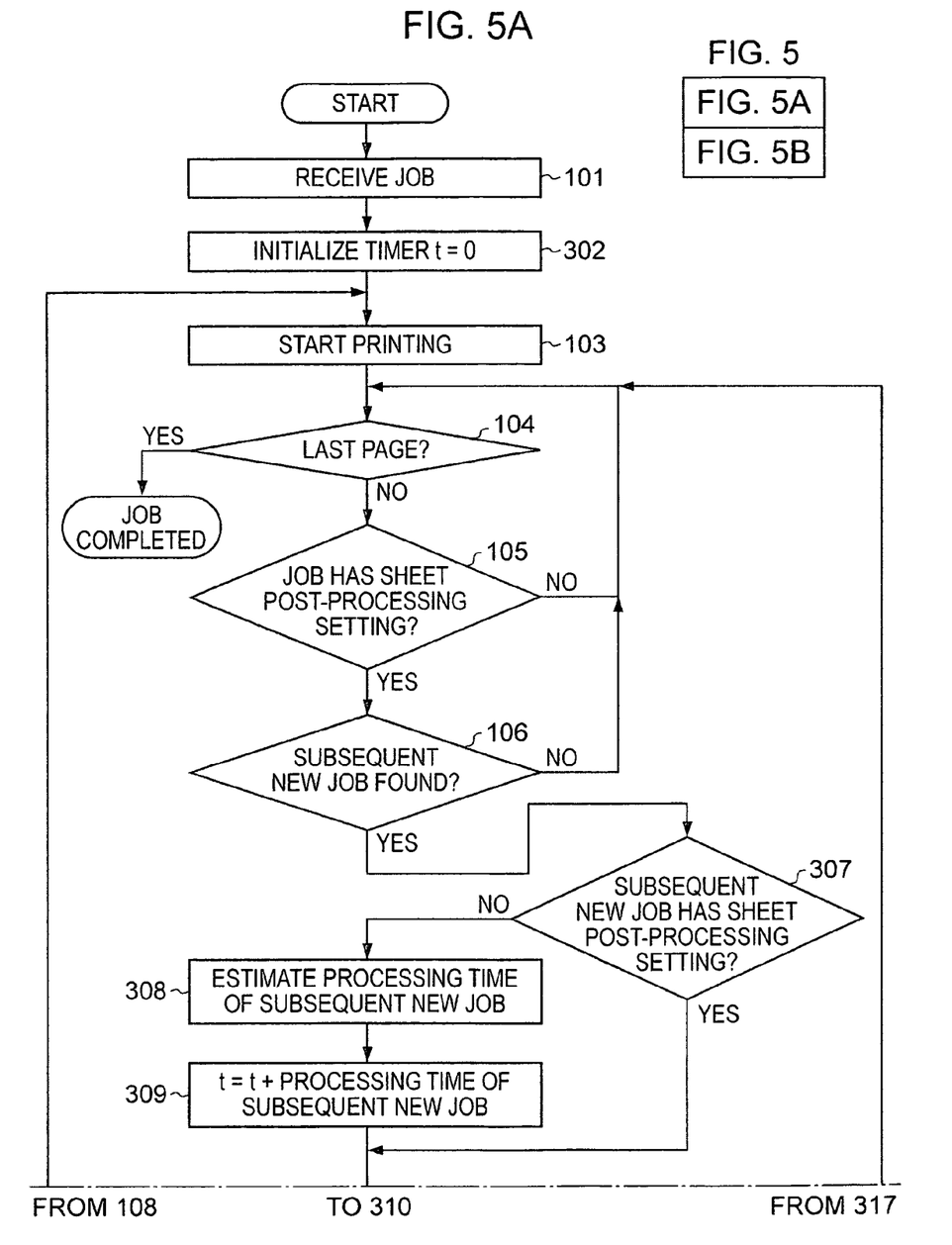
FIG. 5 is a flow chart of an exemplary data processing procedure of an image forming apparatus according to a third embodiment of the present invention.
Figure 5B:
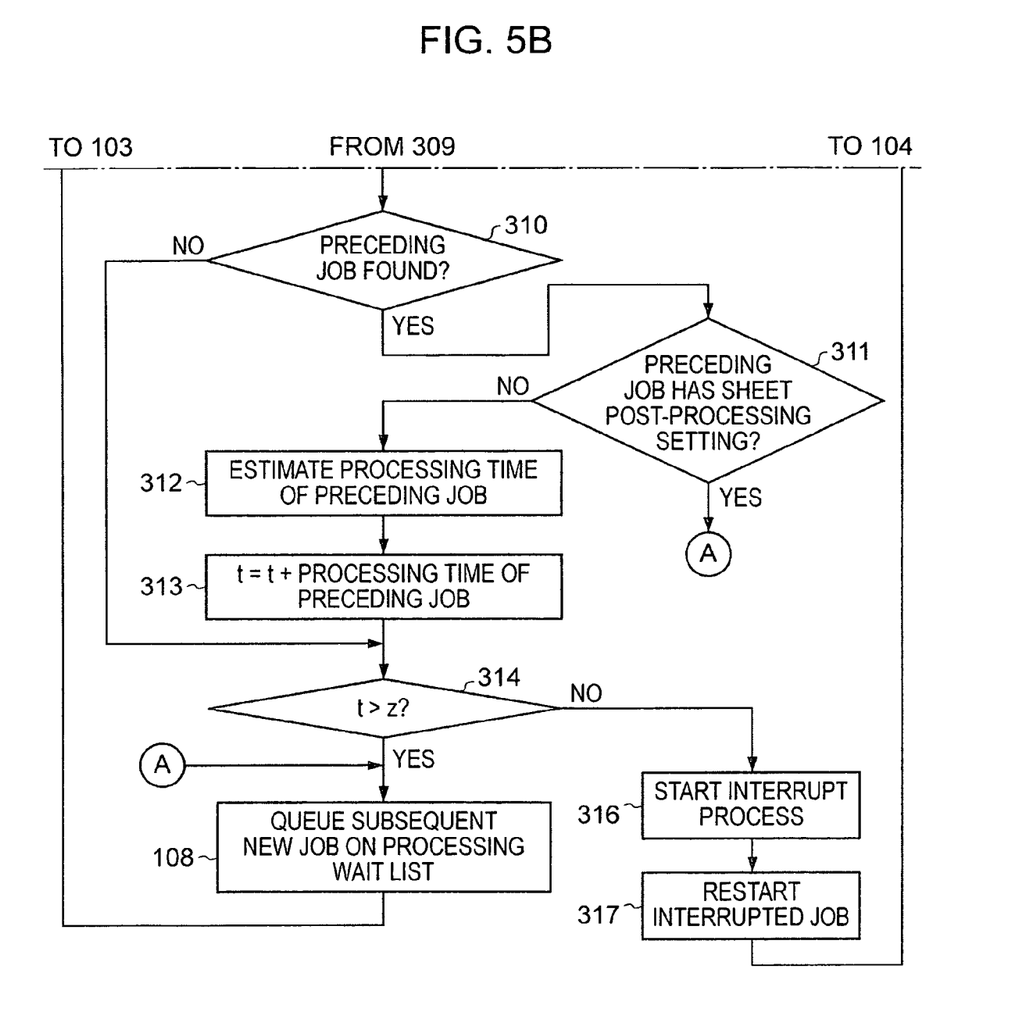

FIG. 5 is a flow chart of an exemplary data processing procedure of an image forming apparatus according to the third embodiment of the present invention. The difference between the present embodiment and the first embodiment (or the second embodiment) is described next. At step 302, a counter that holds a total processing time of jobs that interrupt one job is initialized. At step 307, it is determined whether the subsequent new job has a sheet post-processing setting. If the subsequent new job has no sheet post-processing settings, the processing proceeds to step 308, where the processing time is estimated on the basis of print conditions (e.g., print sheet count). At step 309, the estimated processing time is added to a timer value t in the counter. In contrast, if, at step 307, the subsequent new job has a sheet post-processing setting, the processing proceeds to step 310.

In the third embodiment, the presence of the preceding job waiting to be processed may be taken into account. That is, at step 310, it is determined whether a job waiting to be processed preceding the job currently being processed is present. If a preceding job waiting to be processed is found, it is determined at step 311 whether the preceding job waiting to be processed has a sheet post-processing setting. If the preceding job waiting to be processed has no sheet post-processing settings, at step 312, the processing time of the preceding job waiting to be processed is estimated. At step 313, the estimated processing time is added to the timer value t. At step 314, the total processing time t is compared with a predetermined time z (for example, 10 minutes). If t≤z, the processing proceeds to step 316, where the interruption of the currently being processed job by the subsequent new job is allowed. Thereafter, the processing proceeds to step 317 and the process of the interrupted original job is restarted. If t>z, the processing proceeds from step 314 to step 108.

In the third embodiment, the estimated processing time of a job is stored in the RAM 205. It is noted that if "Yes" is determined at step 311, the processing may proceed to step 108.

Other Exemplary Embodiments

While the first to third embodiments have been described with reference to an electrophotographic color copier, the present invention is not limited to such an application. For example, the present invention can be applied to other image forming apparatuses, such as FAX machines and printers.

Additionally, examples of the sheet post-processing include a folding process, a binding process, and a cutting process in addition to the above-described stapling process and punching process.

Furthermore, in the first to third embodiments, an image forming apparatus determines whether a new job is allowed to interrupt or not. However, a print server that manages the image forming apparatus may determine whether a new job is allowed to interrupt or not.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-147776 filed May 20, 2005, which is hereby incorporated by reference herein in its entirety.

What is claimed is:
1. An image forming apparatus, comprising:
a print job input unit configured to receive a print job;
a job storing unit configured to store a plurality of print jobs;
a job determination unit configured to determine a setting condition of at least one print job from the plurality of print jobs in the job storing unit;
an image forming unit configured to form an image on a sheet based on at least one print job read out from the job storing unit;

a sheet post-processing unit configured to perform post-processing on sheets on which images have been formed; and a control unit configured to determine, in response to, during a time period after start of printing a first job and before completion of printing the first job, the print job input unit inputting a second print job independent from the first job, whether to allow interruption of the first job and start of execution of the second job, wherein, in response to post-processing not being set for the second print job, the control unit allows the interruption of the first job and the start of the execution of the second print job in response to an accumulated number of the second print job and all print jobs that interrupt the first print job being equal to or smaller than a predetermined value, and the control unit inhibits the interruption of the first job and the start of the execution of the second job in response to the accumulated number being larger than the predetermined value, and wherein, in response to post-processing being set for the second print job, the control unit inhibits the interruption of the first job and the start of the execution of the second job.

2. The image forming apparatus according to claim 1, wherein, in response to post-processing not being set for the first print job, the control unit inhibits the interruption of the first job and the start of the execution of the second job.

3. The image forming apparatus according to claim 1, wherein the sheet post-processing unit is configured to carry out for a sheet at least one of a stapling process, a punching process, a folding process, a binding process, and a cutting process.

4. An image forming apparatus, comprising:
a print job input unit configured to receive a print job;
a job storing unit configured to store a plurality of print jobs;
a job determination unit configured to determine a setting condition of at least one print job from the plurality of print jobs in the job storing unit;
an image forming unit configured to form an image on a sheet based on at least one print job read out from the job storing unit;
a sheet post-processing unit configured to perform post-processing on sheets on which images have been formed; and
a control unit configured to determine, in response to, during a time period after start of printing a first job and before completion of printing the first job, the print job input unit inputting a second print job independent from the first job, whether to allow interruption of the first job and start of execution of the second job,
wherein, in response to post-processing not being set for the second print job, the control unit allows the interruption of the first job and the start of the execution of the second print job in response to an accumulated number of printed sheets of the second print job and all print jobs that interrupt the first print job being equal to or smaller than a predetermined value, and the control unit inhibits the interruption of the first job and the start of the execution of the second job in response to the accumulated number printed sheets of being larger than the predetermined value, and
wherein, in response to post-processing being set for the second print job, the control unit inhibits the interruption of the first job and the start of the execution of the second job.

5. The image forming apparatus according to claim 4, wherein, in response to post-processing not being set for the first print job, the control unit inhibits the interruption of the first job and the start of the execution of the second job.

6. An image forming apparatus, comprising:
a print job input unit configured to receive a print job;
a job storing unit configured to store a plurality of print jobs;
a job determination unit configured to determine a setting condition of at least one print job from the plurality of print jobs in the job storing unit;
an image forming unit configured to form an image on a sheet based on at least one print job read out from the job storing unit;
a sheet post-processing unit configured to perform post-processing on sheets on which images have been formed; and
a control unit configured to determine, in response to, during a time period after start of printing a first job and before completion of printing the first job, the print job input unit inputting a second print job independent from the first job, whether to allow interruption of the first job and start of execution of the second job,
wherein, in response to post-processing not being set for the second print job, the control unit allows the interruption of the first job and the start of the execution of the second print job in response to an accumulated time to process the second print job and all print jobs that interrupt the first print job being equal to or shorter than a predetermined time, and the control unit inhibits the interruption of the first job and the start of the execution of the second job in response to the accumulated time being longer than the predetermined time, and
wherein in response to post-processing being set for the second print job, the control unit inhibits the interruption of the first job and the start of the execution of the second job.

7. The image forming apparatus according to claim 6, wherein, in response to post-processing not being set for the first print job, the control unit inhibits the interruption of the first job and the start of the execution of the second job.

8. The image forming apparatus according to claim 6, wherein the control unit computes the accumulated time based on a setting condition of each print job.

9. A method of controlling an image forming apparatus, the image forming apparatus including a print job input unit configured to receive a print job, a job storing unit configured to store a plurality of print jobs, a job determination unit configured to determine a setting condition of at least one print job from the plurality of print jobs in the job storing unit, an image forming unit configured to form an image on a sheet based on at least one print job read out from the job storing unit, and a sheet post-processing unit configured to perform post-processing on sheets on which images have been formed, the control method comprising:
determining, using a processor and in response to, during a time period after start of printing a first job and before completion of printing the first job, the print job input unit inputting a second print job independent from the first job, whether post-processing is set for the second print job;
in response to determining that post-processing is not set for the second print job, allowing the interruption of the first job and the start of the execution of the second print job in response to an accumulated number of the second print job and all print jobs that interrupt the first print job being equal to or smaller than a predetermined value, and inhibiting the interruption of the first job and the start of the execution of the second job in response to the accumulated number being larger than the predetermined value; and in response to determining that post-processing is set for the second print job, inhibiting the interruption of the first job and the start of the execution of the second job.

10. A method of controlling an image forming apparatus, the image forming apparatus including a print job input unit configured to receive a print job, a job storing unit configured to store a plurality of print jobs, a job determination unit configured to determine a setting condition of at least one print job from the plurality of print jobs in the job storing unit, an image forming unit configured to form an image on a sheet based on at least one print job read out from the job storing unit, and a sheet post-processing unit configured to perform post-processing on sheets on which images have been formed, the control method comprising:

determining, using a processor and in response to, during a time period after start of printing a first job and before completion of printing the first job, the print job input unit inputting a second print job independent from the first job, whether post-processing is set for the second print job;

in response to determining that post-processing is not set for the second print job, allowing the interruption of the first job and the start of the execution of the second print job in response to an accumulated number of printed sheets of the second print job and all print jobs that interrupt the first print job being equal to or smaller than a predetermined value, and inhibiting the interruption of the first job and the start of the execution of the second job in response to the accumulated number printed sheets of being larger than the predetermined value; and in response to determining that post-processing is set for the second print job, inhibiting the interruption of the first job and the start of the execution of the second job.

11. A method of controlling an image forming apparatus, the image forming apparatus including a print job input unit configured to receive a print job, a job storing unit configured to store a plurality of print jobs, a job determination unit configured to determine a setting condition of at least one print job from the plurality of print jobs in the job storing unit, an image forming unit configured to form an image on a sheet based on at least one print job read out from the job storing unit, and a sheet post-processing unit configured to perform post-processing on sheets on which images have been formed, the control method comprising:

determining, using a processor and in response to, during a time period after start of printing a first job and before completion of the printing the first job, the print job input unit inputting a second print job independent from the first job, whether post-processing is set for the second print job; in response to determining that post-processing is not set for the second print job, allowing the interruption of the first job and the start of the execution of the second print job in response to an accumulated time to process the second print job and all print jobs that interrupt the first print job being equal to or shorter than a predetermined time, and inhibiting the interruption of the first job and the start of the execution of the second job in response to the accumulated time being longer than the predetermined time; and in response to determining that post-processing is set for the second print job, inhibiting the interruption of the first job and the start of the execution of the second job.

* * * * *